J. F. CLARKE.
STEP TREAD.
APPLICATION FILED JULY 3, 1915.
1,157,083.
Patented Oct. 19, 1915.
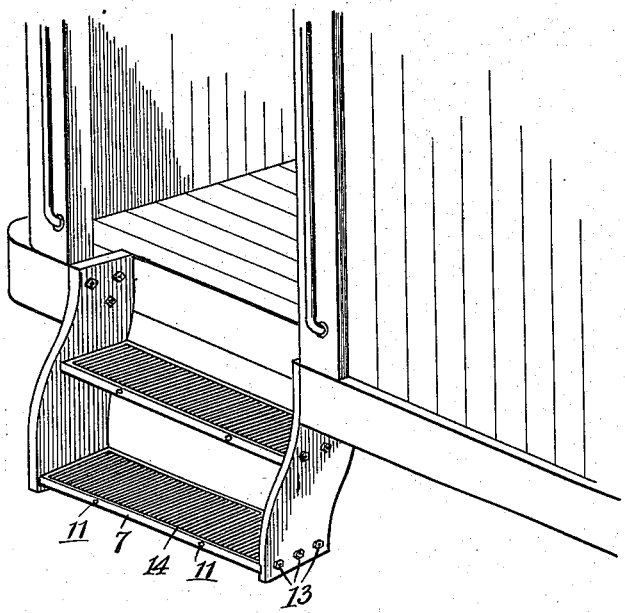
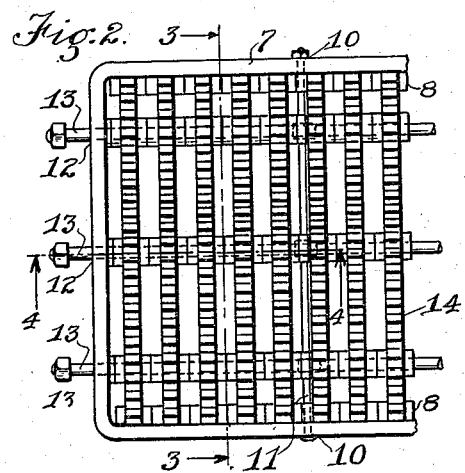
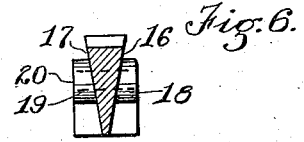
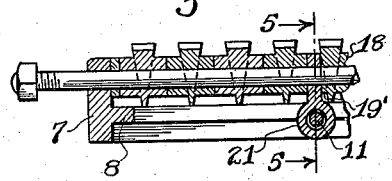
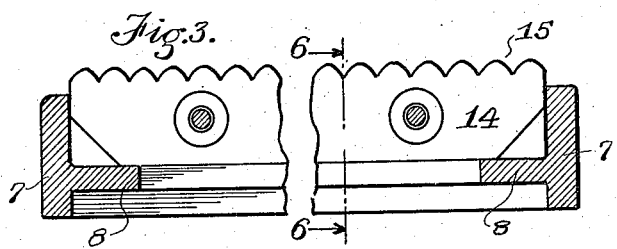
Inventor.
James F. Clarke.
By Edmund A. Strauss,
Att'y.

UNITED STATES PATENT OFFICE.

JAMES F. CLARKE, OF LOS ANGELES, CALIFORNIA.

STEP-TREAD.

1,157,083.  Specification of Letters Patent.  Patented Oct. 19, 1915.

Application filed July 3, 1915. Serial No. 37,992.

*To all whom it may concern:*

Be it known that I, JAMES F. CLARKE, a citizen of the United States, residing at Los Angeles, in the county of Los Angeles and State of California, have invented new and useful Improvements in Step-Treads, of which the following is a specification.

This invention relates to step treads, and pertains especially to step treads for vehicles, such as street cars.

It is an object of this invention to provide a step tread which is non-slipping, self cleaning and which is strong and durable.

It is another object of this invention to provide a step tread comprised of a plurality of tread pieces having a serrated tread surface and which are removable and interchangeable.

It is a further object to provide a means for supporting and connecting the tread pieces whereby they may be easily removed or interchanged.

The invention is illustrated in the accompanying drawings, in which:

Figure 1 is a perspective view of a car platform showing the improved tread applied thereto. Fig. 2 is a fragmentary plan view of my improved step tread. Fig. 3 is a broken section taken on the line 3—3 of Fig. 2. Fig. 4 is a fragmentary section taken on the line 4—4 of Fig. 2. Fig. 5 is a section taken on the line 5—5 of Fig. 4. Fig. 6 is a section taken on the line 6—6 of Fig. 3.

More specifically, 7 indicates a frame for the step tread which is here shown as rectangular in form and having an interior flange 8 on the long sides of the frame. The flange 8 is for the purpose of supporting the tread pieces. Apertures 10 are formed in the long sides of the frame for the purpose of receiving bolts 11. The latter serve to strengthen and assist to support the tread pieces. Apertures 12 are formed in the short sides of the frame for receiving bolts 13 which are designed to secure in place the tread pieces and assist in supporting them.

Tread pieces 14 are formed with serrated upper surfaces 15 and have their sides 16 and 17 converging downwardly to form a taper. Each tread piece is formed with bosses 18 and 19 on opposite sides in alinement with the apertures 12. The bosses are apertured as indicated at 20, the apertures registering with the apertures 12 in the frame, so that when the tread pieces are assembled the bolts 13 may be passed through the registering apertures 20 in each of the tread pieces, thereby securing them in position. The bosses separate the tread pieces and provide spaces therebetween through which dirt may pass.

The tread pieces which are disposed adjacent to and parallel with the bolts 11 have one boss of such length as indicated at 19' that a tie member 21, which is preferably comprised of two integral washers with their planes at right angles, may be inserted between the boss 19' and the adjacent boss 18. Bolt 11 is passed through the lower washer portion of the tie member 21, thereby tying the bolts 11 and 12 and forming a secure support for the tread pieces between the flanges 8.

It will be evident that the step tread is easily assembled by placing the tread pieces upon the frame 7 and inserting the bolts 12; tie members 21 being inserted at the places adjacent the position for bolts 11. Bolts 11 are then inserted through the tie members and the nuts or bolts 13 and 11 tightened. The structure is such that any tread piece may be easily removed and a new one substituted.

An important feature of my invention is the transversely tapered tread piece whereby the space between tread pieces is greater at the bottom than at the top. By reason of this construction dirt which would pack between the tread pieces in structures of this character which have heretofore been built, passes readily downwardly making the step self cleaning.

What I claim is:

1. A step tread, comprising a frame having a plurality of oppositely disposed rod receiving openings, rods passing through said openings and extending longitudinally across said frame, and a series of transversely tapered tread members having apertured hubs engaged by said rods.

2. A step tread, comprising a frame having a plurality of oppositely disposed rod receiving openings, rods passing through said openings and extending longitudinally across said frame, rods extending transversely of said frame, removable tie members securing the longitudinal and transverse rods, and a series of removable tread members supported on said frame having apertured hubs engaged by said longitudinal rods.

3. A step tread, comprising a frame having a plurality of oppositely disposed bolt receiving openings, bolts passing through said openings and extending longitudinally across said frame, bolts extending transversely of said frame, removable tie members securing the longitudinal and transverse bolts, and a series of transversely tapered removable tread members having apertured hubs engaged by said longitudinal bolts.

4. A step tread, comprising a rectangular frame, a plurality of transversely tapered tread members formed with serrated upper edges, spacing hubs formed on opposite sides of the tread members having apertures therein, and bolts passing through said apertured hubs and through the end members of the frame to secure the tread members and the frame together.

5. A step tread, comprising a rectangular frame provided with an interior flange, a plurality of transversely tapered tread members resting upon said flange, spacing hubs formed on opposite sides of the tread members having apertures therein, bolts passing through said apertured hubs and through the end members of the frame, bolts passing through said frame transverse to said first named bolts and tie members securing said first named bolts and said transverse bolts.

In witness that I claim the foregoing I have hereunto subscribed my name this 7th day of June, 1915.

JAMES F. CLARKE.

Copies of this patent may be obtained for five cents each, by addressing the "Commissioner of Patents, Washington, D. C."